US006368042B1

(12) United States Patent
Gagnon et al.

(10) Patent No.: US 6,368,042 B1
(45) Date of Patent: Apr. 9, 2002

(54) VEHICLE LOADING AND UNLOADING SYSTEM

(75) Inventors: Pierre Gagnon; Pierre Laforest, both of Montreal; Alain Forte, Boucherville; Alain Gobeil, Montreal, all of (CA)

(73) Assignee: Gestion Laforest Inc., St-Hubert (CA)

( * ) Notice: Subject to any disclaimer, the term of this patent is extended or adjusted under 35 U.S.C. 154(b) by 0 days.

(21) Appl. No.: 09/501,524

(22) Filed: Feb. 9, 2000

Related U.S. Application Data

(60) Provisional application No. 60/120,407, filed on Feb. 11, 1999.

(51) Int. Cl.[7] .............................................. B65G 67/02
(52) U.S. Cl. ....................... 414/392; 414/341; 414/399; 180/401
(58) Field of Search ......................... 187/232; 180/401; 414/399, 341, 392

(56) References Cited

U.S. PATENT DOCUMENTS

| | | | | |
|---|---|---|---|---|
| 3,872,793 A | * | 3/1975 | Patin | 104/130 |
| 4,057,019 A | * | 11/1977 | Shaffer | 104/247 |
| 4,941,794 A | * | 7/1990 | Hara et al. | 414/341 |

* cited by examiner

Primary Examiner—Steven A. Bratlie

(74) Attorney, Agent, or Firm—Francois Martineau

(57) ABSTRACT

A conveyor conveys palletized articles to a loading dock. A bogie movable along rails between different loading docks, supports an independently movable carriage, which may roll out of the bogie once the latter reaches a desired loading dock. The carriage then loads with a forklift provided on the carriage, the articles from the conveyor into a semi-trailer located at the loading dock. The carriage is provided with a linkage pivotally installed on its main frame, the linkage carrying four lateral guide wheels which protrude laterally beyond all other structural elements of the carriage. The linkage integrally links the guide wheels into a common pivotal displacement, with the guide wheels remaining symmetrically disposed relative to the carriage frame. A hydraulic piston biases the guide wheels towards an outer limit position at all times, and the guide wheels are forcibly pivotable, against the bias of the piston, towards an inner limit position. The bogie carrying the carriage is provided with fixed lateral railings, and with pivotable gates which may be pivoted into an opened condition when the bogie is in facing register with the loading dock, until the gates outer free end portions abut against the inner side walls of the semi-trailer. Thus, continuous side panels are formed on each side of the carriage, by the railings, gates and semi-trailer side walls. The carriage may then move between the bogie and semi-trailer with its guide wheels continuously engaging the side panels, for allowing the carriage to self-align and self-center itself into the semi-trailer due to the bias on the linkage of the piston while article loading and unloading operations are accomplished.

18 Claims, 11 Drawing Sheets

VEHICLE LOADING AND UNLOADING SYSTEM

CROSS-REFERENCE DATA

The present application claims the priority under 35 U.S.C. 119(e) of United States provisional application No. 06/120,407 filed on Feb. 11, 1999.

FIELD OF THE INVENTION

The present invention relates to a vehicle loading and unloading system, and more particularly to a system including an automated forklift carriage used for loading and unloading articles into and from transport trucks.

BACKGROUND OF THE INVENTION

U.S. Pat. No. 4,439,093 issued in 1984 to R. W. Victorino discloses a system for handling palletized articles. This system includes inter alia the step of loading the palletized articles into a conventional semi-trailer truck with a conventional forklift truck, as known in the art. However, it becomes difficult to efficiently load a semi-trailer truck with palletized articles, without unnecessarily losing space inside the truck, and at an efficient speed, without the forklift truck driver accidentally hitting the semi-trailer truck walls with the articles while loading them, considering the often small lateral clearance between the forklift truck loaded with articles and the semi-trailer lateral walls.

Some automated truck loading systems have been developed, such as the one shown in U.S. Pat. No. 4,171,178 issued in 1979 to R. Birkenfeld et al. In this patent, a rail-guided carriage is shown to be used to load a truck from its lateral sides. The rail-guided carriage has the disadvantage of requiring a flawless alignment of the truck relative to the loading dock for loading the articles into the truck in a space-efficient manner. Indeed, should the truck be positioned in a non-parallel relationship with the carriage rails, then the articles will be positioned in a non-parallel fashion relative to the truck walls, and economically valuable space will be wasted inside the semi-trailer. Also, the Birkenfeld patent shows a truck being loaded sidewardly, but it is understood that it is more complex and it requires more precision for a carriage to be aligned relative to the rear opening of a conventional rearwardly-opened semi-trailer truck such as the one shown in the above-mentioned Victorino patent, than it is for a carriage to be aligned with the often wider side openings of laterally loaded trucks such as the one shown in the Birkenfeld patent. Also, conventional merchandise semi-trailers are more often provided with a rear opening, so the Birkenfeld system is not representative of the most likely type of truck encountered.

OBJECTS OF THE INVENTION

It is thus an object of the present invention to circumvent the disadvantages of the prior art systems and apparatuses, by providing a truck loading system which allows a conventional truck to be loaded with articles which will be automatically aligned relative to the truck opening.

It is another object of the present invention to provide an article-carrying carriage which will self-align itself between fixed spaced-apart surfaces.

SUMMARY OF THE INVENTION

The present invention relates to a carriage for carrying articles, said carriage having two sides, and a front and a rear end defining a longitudinal axis therebetween, said carriage comprising a main rigid frame, ground-engaging wheels rollably mounted to said frame parallel to said longitudinal axis for carrying said frame over ground, a motor mounted to said frame for feeding power to and driving said carriage along said longitudinal axis, a powered article-carrying device mounted to said carriage frame for carrying the articles on said carriage, and a number of lateral idle guide wheels horizontally rollably mounted to said frame and laterally protruding beyond said frame on both said carriage sides for rollable abutment of said alignment wheels against lateral surfaces for allowing self-alignment of said carriage with respect to the lateral surfaces when said carriage is moving along said longitudinal axis.

Preferably, the carriage further comprises a linkage pivotally attached to said frame and rollably carrying said idle guide wheels, said guide wheels forced by said linkage into an integral common displacement relative to said frame so as to remain symmetrically disposed relative to said frame at all times, said guide wheels carried by said linkage being movable between an inner limit position toward said frame and an outer limit position away from said frame, said carriage also comprising a spring member mounted to said frame and continuously biasing said wheels through the instrumentality of said linkage towards said outer limit position; and wherein said carriage is adapted for self-alignment between spaced-apart surfaces by means of said guide wheels continuously rollably engaging the spaced-apart surfaces and by means of said linkage and said spring member forcing said guide wheels to remain symmetrically disposed relative to said carriage frame.

Preferably, said carriage further comprises a control unit for automatically controlling the displacement of said carriage along said longitudinal axis.

Preferably, said spring member is a hydraulic cylinder.

Preferably, said article-carrying member is a powered hydraulic forklift member located at said carriage front end.

The present invention also relates to a vehicle loading and unloading system for loading articles into and unloading articles from a number of vehicles each located at a respective loading station and each including a storage area having an open end and inner side walls, said system including:
  a carriage for carrying articles, said carriage having two sides, and a front and a rear end defining a longitudinal axis therebetween, said carriage comprising a main rigid frame, ground-engaging wheels rollably mounted to said frame parallel to said longitudinal axis for carrying said frame over ground, a motor for feeding power to and driving said carriage along said longitudinal axis, a powered article-carrying device mounted to said frame for carrying the articles on said carriage, and a number of lateral idle guide wheels horizontally rollably mounted to said frame and laterally protruding beyond said frame on both said carriage sides for rollable abutment of said guide wheels against the vehicle storage area side walls for allowing self-alignment of said carriage with respect to the vehicle storage area side walls when said carriage is moving along said longitudinal axis; and
  a bogie, able to carry said carriage and movable along a bogie horizontal axis transverse to said carriage longitudinal axis, said bogie comprising a motor for feeding power to and moving said bogie along said bogie axis, and a platform for receiving and supporting said carriage thereon and defining two sides and a front and a rear end portions, said bogie front end portion being opened at least when said carriage rolls out of and back onto said bogie; wherein said bogie is movable between the loading stations to allow said carriage to load articles onto and unload articles from the different vehicles storage areas located at each one of the loading stations.

Preferably, said carriage further comprises a linkage pivotally attached to said frame and rollably carrying said idle guide wheels, said guide wheels forced by said linkage into an integral common displacement relative to said frame so as to remain symmetrically disposed relative to said frame at all times, said guide wheels carried by said linkage being movable between an inner limit position toward said frame and an outer limit position away from said frame, said carriage further comprising a spring member mounted to said frame and continuously biasing said wheels through the instrumentality of said linkage towards said outer limit position; and wherein said carriage is adapted for self-alignment and self-centering between the vehicle storage area side walls by means of said guide wheels rollably engaging the side walls and by means of said linkage and said spring member forcing said guide wheels to remain symmetrically disposed relative to said carriage frame.

Preferably, said bogie comprises two parallel railings each fixedly attached to a corresponding said side of said bogie, the distance between said railings being equal to or lesser than the width of said carriage when said guide wheels are in said outer limit position, said railings vertically registering with said guide wheels, said guide wheels consequently continuously engaging said railings while said carriage is located between said railings for self-aligning and self-centering said carriage on said bogie due to said spring member and said linkage.

Preferably, said bogie further comprises a pair of gates pivotally mounted on each said side of said bogie at said bogie front end portion, said gates vertically registering with said carriage guide wheels and being pivotable between a closed condition in which they do not extend beyond the bogie front end portion, and an opened condition in which they extend beyond the bogie front end portion in a co-extensive and substantially collinear fashion relative to said railings, said gates having outer free ends destined to engage the two vehicle storage area side walls, for providing continuous side panels formed on either side of said carriage by said railings, said gates and the vehicle side walls, for continuous engagement of the side panels by said carriage guide wheels when said carriage moves between said bogie and said vehicle, said carriage thus being self-aligned and self-centered relative to said vehicle storage area during article loading and unloading operations in said vehicle storage area.

Preferably, said system further comprises a control unit for automatically controlling the displacement of said bogie along said bogie axis, the displacement of said carriage along said longitudinal axis, and the pivotal displacement of said gates.

Preferably, said spring member is a hydraulic cylinder.

Preferably, said article-carrying member is a powered hydraulic forklift member located at said carriage front end.

Preferably, said system further comprises a conveyor for conveying articles and located frontwardly of said bogie, wherein said carriage is destined to carry the articles with said forklift member from said conveyor into the vehicle for unloading them therein.

Preferably, said conveyor is an overhead conveyor located spacedly above ground, said carriage carrying the articles being destined to move underneath said overhead conveyor and to reach the articles on the conveyor with said forklift member.

Preferably, said control unit further automatically controls said conveyor, for positioning the articles thereon in a precise centered relationship relative to said bogie.

Preferably, said bogie is movable on fixed rails.

The present invention further relates to a vehicle loading and unloading system for loading articles into and unloading articles from a number of vehicles each located at a respective loading station and each having a storage area including an open end and parallel inner side walls, said system including:

a loading dock at each said loading station, adapted to receive in a closely adjacent fashion the open end of the vehicle;

a bridge panel at each said loading station, for bridging each said loading dock with a corresponding vehicle storage area;

a carriage for carrying articles, said carriage having two sides, and a front and a rear end defining a longitudinal axis therebetween, said carriage comprising:
  a main rigid frame;
  ground-engaging wheels rollably mounted to said frame parallel to said longitudinal axis for carrying said frame over ground;
  a motor for feeding power to and driving said carriage along said longitudinal axis;
  a powered forklift member mounted to said frame at said front end thereof for carrying the articles on said carriage;
  a linkage pivotally attached to said frame;
  a number of lateral idle guide wheels horizontally rollably mounted to said linkage and laterally protruding beyond said frame on both said carriage sides, said guide wheels forced by said linkage into an integral common displacement relative to said frame so as to remain symmetrically disposed relative to said frame at all times, said guide wheels carried by said linkage being movable between an inner limit position toward said frame and an outer limit position away from said frame; and
  a spring member mounted to said frame and continuously biasing said wheels through the instrumentality of said linkage towards said outer limit position;

said system further comprising:
  a bogie mounted to fixed rails, able to carry said carriage and movable along a bogie horizontal axis transverse to said carriage longitudinal axis, said bogie comprising:
    a motor for feeding power to and moving said bogie along said bogie axis;
    a platform for receiving and supporting said carriage thereon and defining two sides and a front and a rear end portions;
    two parallel railings each fixedly attached to a corresponding said side of said bogie, the distance between said railings being equal to or lesser than the width of said carriage when said guide wheels are in said outer limit position, said railings vertically registering with said guide wheels; and
    a pair of gates pivotally mounted on each said side of said bogie at said bogie front end portion and defining outer free ends, said gates vertically registering with said guide wheels and being pivotable between a closed condition in which they do not extend beyond the bogie front end portion, and an opened condition in which they extend beyond the bogie front end portion in a co-extensive and substantially collinear fashion relative to said railings, and in which they clear the bogie front end portion;

and said system further comprising a conveyor, for conveying articles to be loaded into vehicles to each said loading station and for conveying articles unloaded from vehicles from each said loading station;

wherein said bogie is movable between the loading stations to allow said carriage to load articles onto or unload articles from vehicles located at each one of the loading stations, with said gates opening at each station where loading or unloading operations are to take place, said gates destined to abut with their outer free end portions against the side walls of the vehicle for forming with said railings and the vehicle side walls continuous side panels which will be continuously engaged by said carriage guide wheels while said carriage moves between said bogie and said vehicle storage area, thereby allowing self-alignment and self-centering of said carriage into said vehicle storage area due to the bias of said spring member against said guide wheels through the instrumentality of said linkage.

DETAILED DESCRIPTION OF THE EMBODIMENTS

Figure 1:
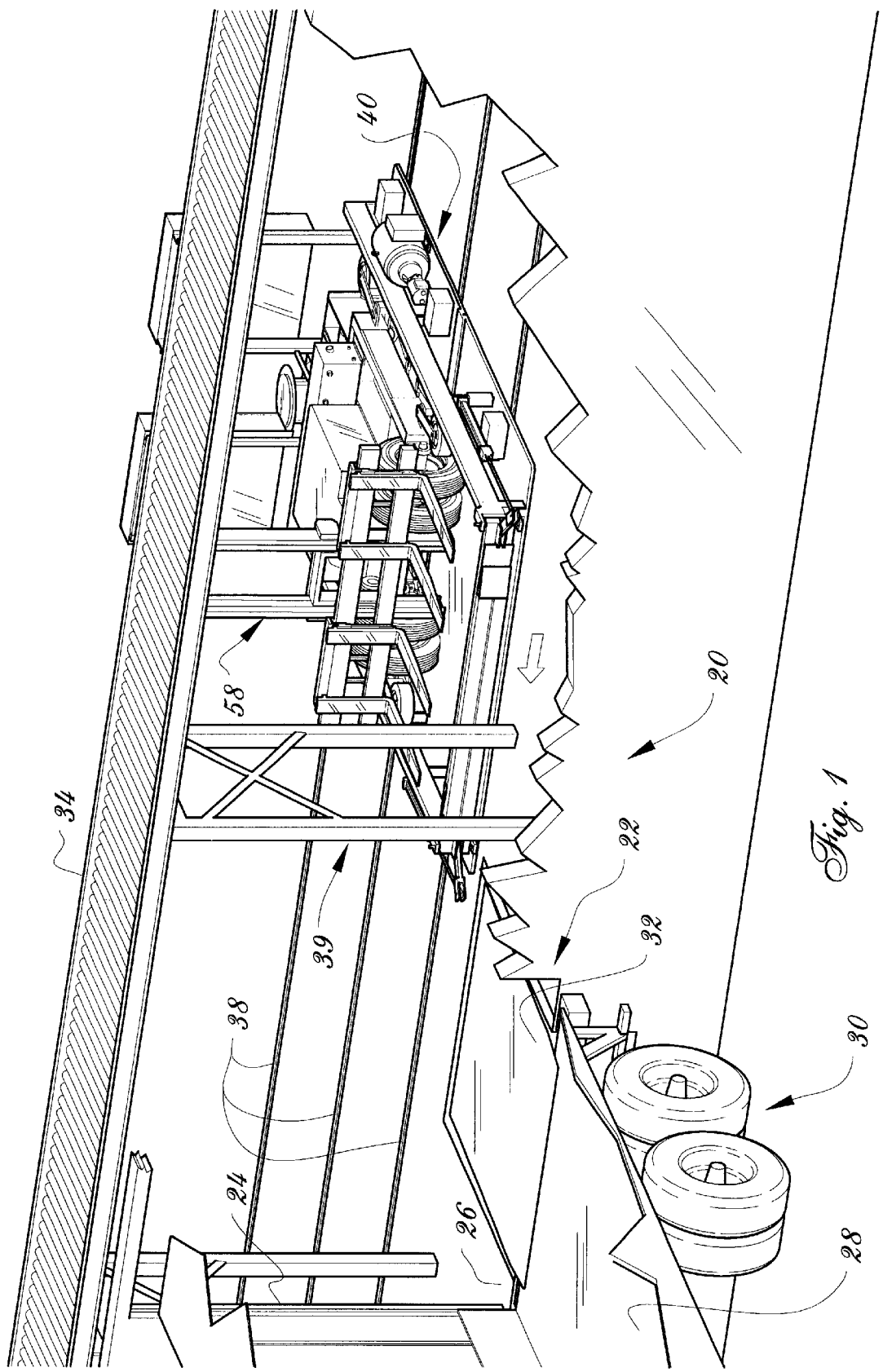
FIG. 1 is a perspective view of a loading dock, with the adjacent wall being broken away for showing the inner components of the loading station registering with the loading dock, FIG. 1 further showing the rear portion of a semi-trailer positioned so as to register with the loading dock and loading station, and the carriage-carrying bogie moving towards the loading station.

FIG. 1 shows a loading station 20 including a loading dock 22 defined by an opening 24 in a wall of a building and a floor portion 26 which is substantially at a same height as the flooring 28 of a semi-trailer 30 which registers with loading station 20. As known in the art, a pivotable panel 32 hingedly attached to dock floor 26 bridges the dock floor 26 and the semi-trailer floor 28 and acts as a ramp to compensate any vertical offset between dock floor 26 and semi-trailer floor 28.

In the description hereinafter, reference will be made to the loading of articles into semi-trailer 30, although it is understood that the unloading of articles therefrom could be accomplished by reversing the steps accomplished to load the semi-trailer 30. Also, although a semi-trailer conventionally used with a truck is shown, it is understood that loading and unloading of articles with the system according to the present invention could be accomplished onto other vehicles or machinery having a similar structure as the semi-trailer 30.

Figure 2:
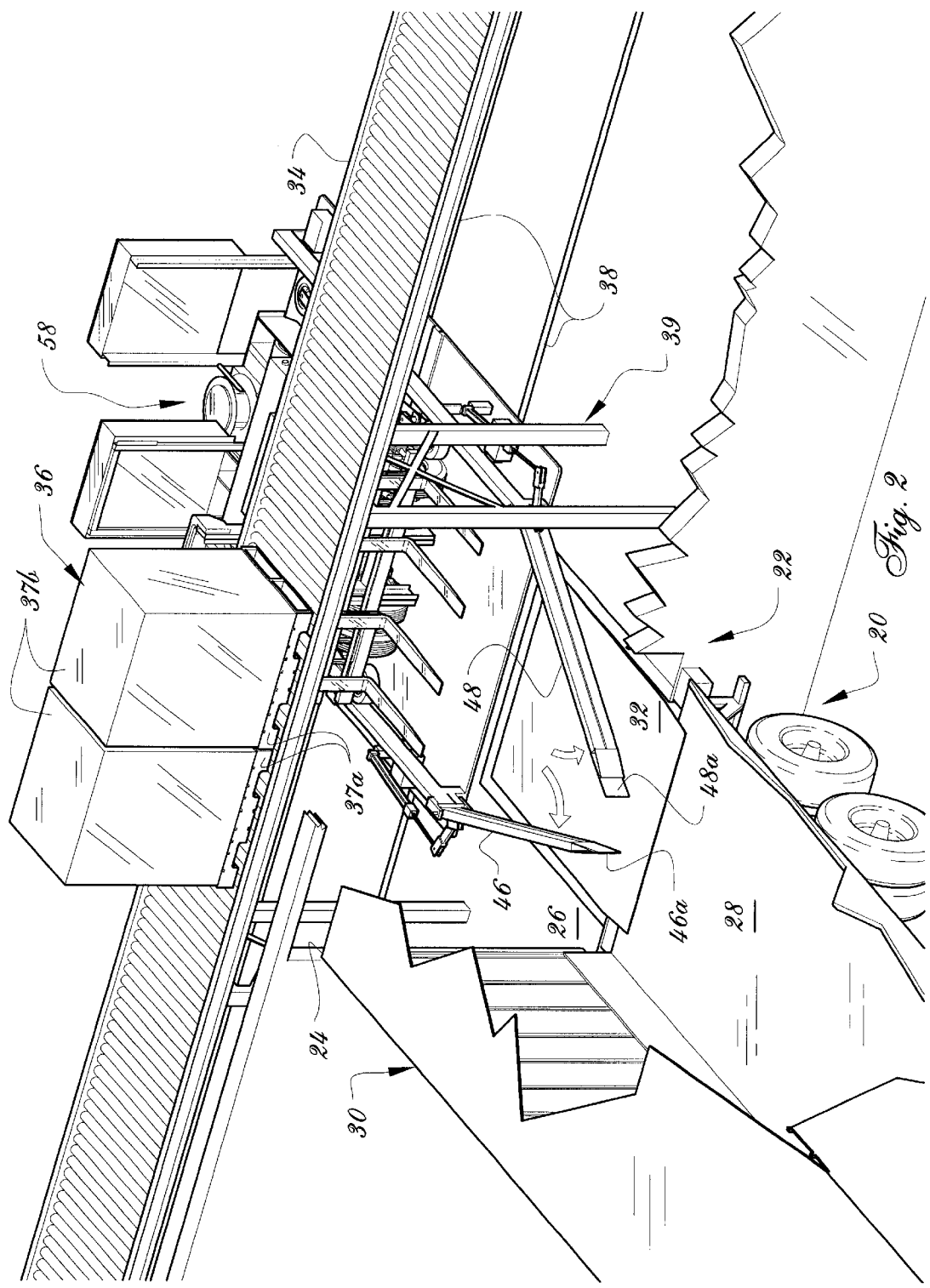
FIG. 2 is a perspective view similar to FIG. 1, although at a slightly different angle, wherein the carriage-carrying bogie is aligned with the loading station, wherein the pivotable alignment gates are in a partly opened position and wherein palletized articles to be loaded into the semi-trailer are located on the overhead conveyor of the truck loading station.

FIGS. 1 and 2 show that loading station 20 further includes an overhead conveyor 34 of conventional construction, which is destined to convey palletized articles 36 to loading station 20, i.e. in general register with dock 22, as will be detailed hereinafter. Conveyor 34 runs parallel to dock opening 24 and vertically clears same by the support of spaced-apart upright posts 39 which horizontally clear opening 24. Palletized articles 36 include two pallets 37a supporting boxed goods 37b.

A set of three rails 38 are fixedly installed on the floor parallel to the dock opening 24, so as to carry a bogie 40 movable along rails 38 between loading station 20 and other similar loading stations (not shown). Rails 38 run parallel to conveyor 34, and thus bogie 40 is movable parallel to and along conveyor 34, as suggested in FIG. 1. To load articles 36 into semi-trailer 30, bogie 40 is initally automatically positioned in centered register with dock opening 24, as shown in FIG. 2. Also, conveyor 34 moves to align articles 36 with bogie 40, and thus articles 36 and bogie 40 are always symmetrically aligned relative to each other through electronic control devices (not shown).

Figure 5:
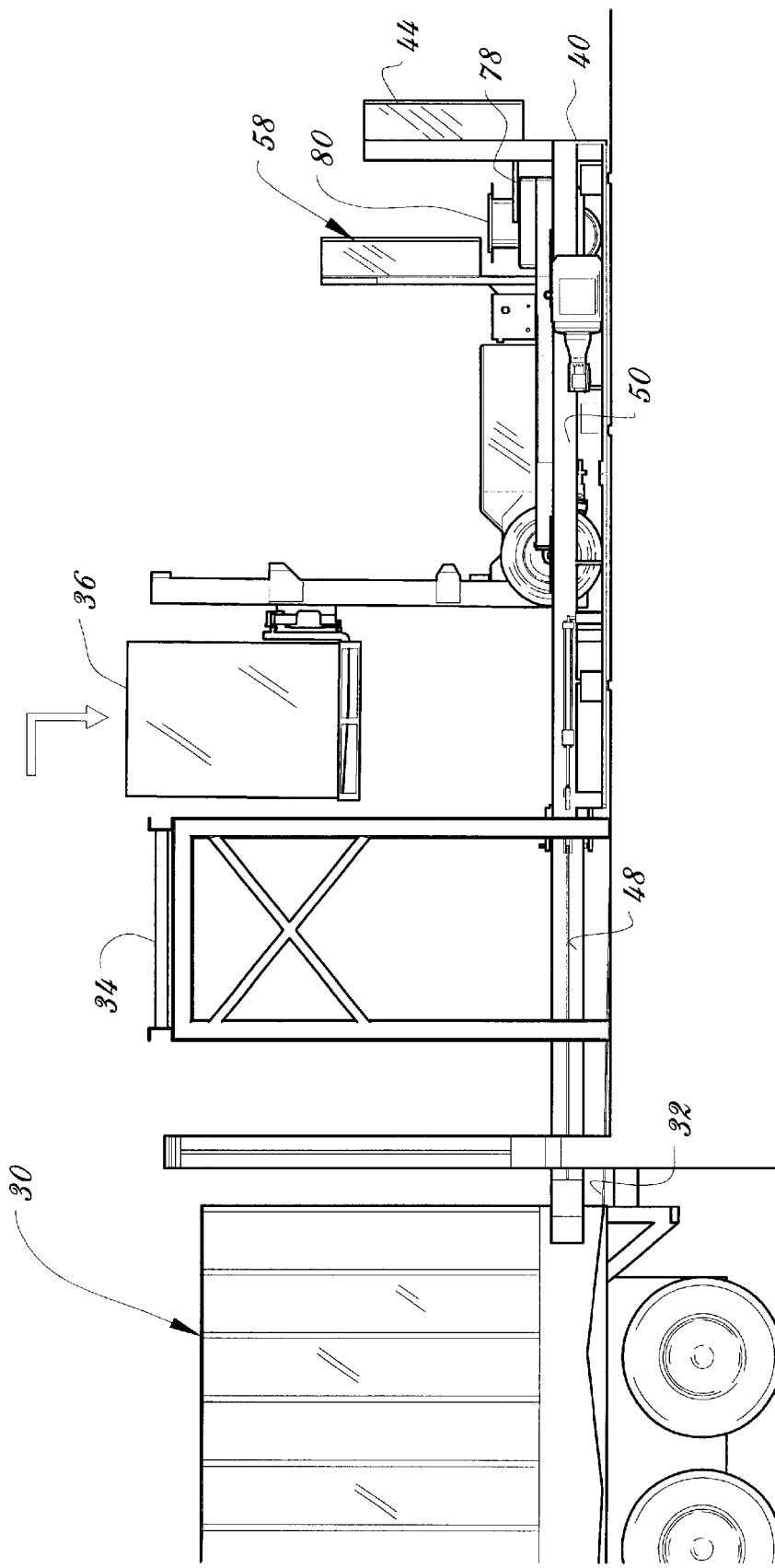
Figure 6:
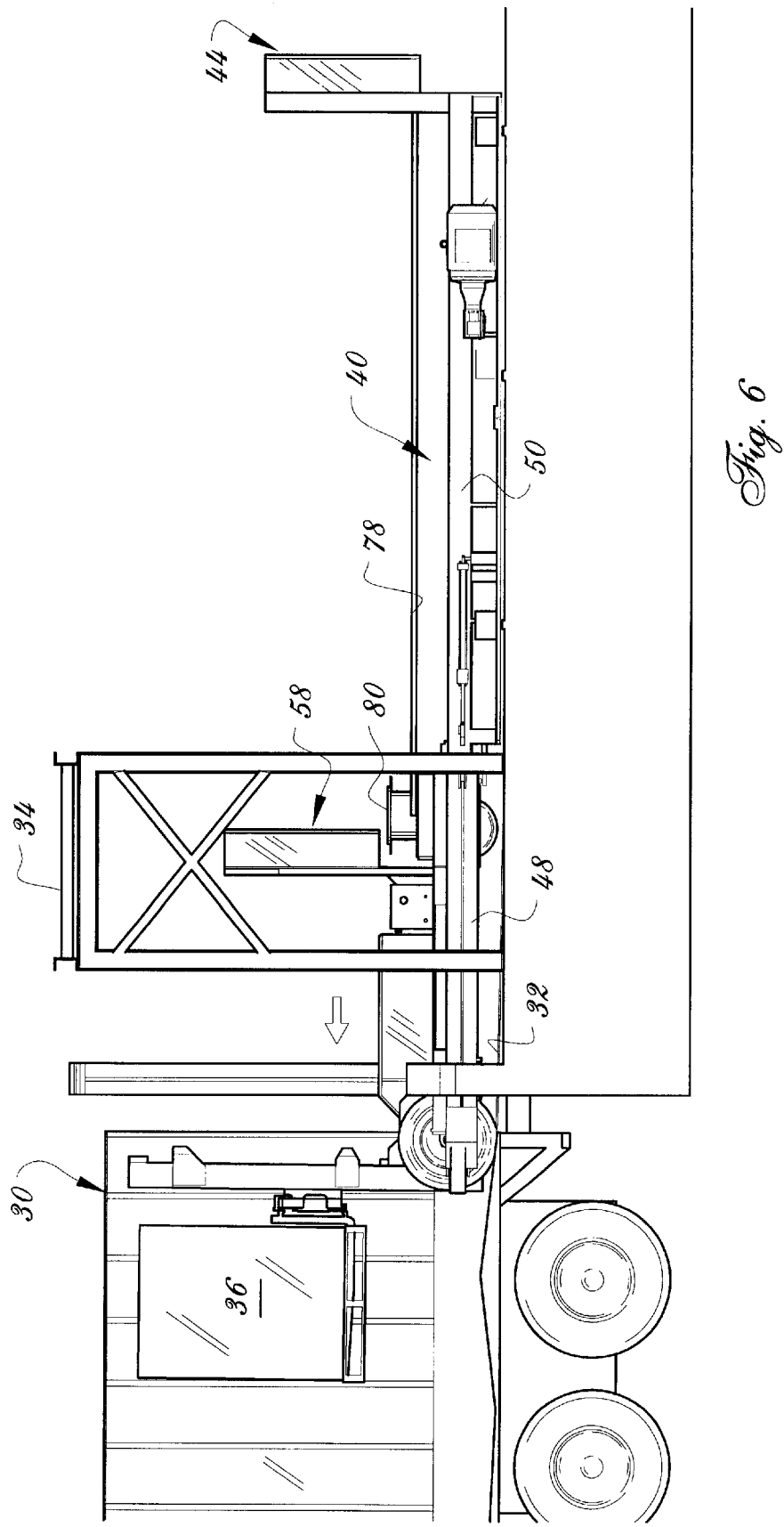
Figure 7:
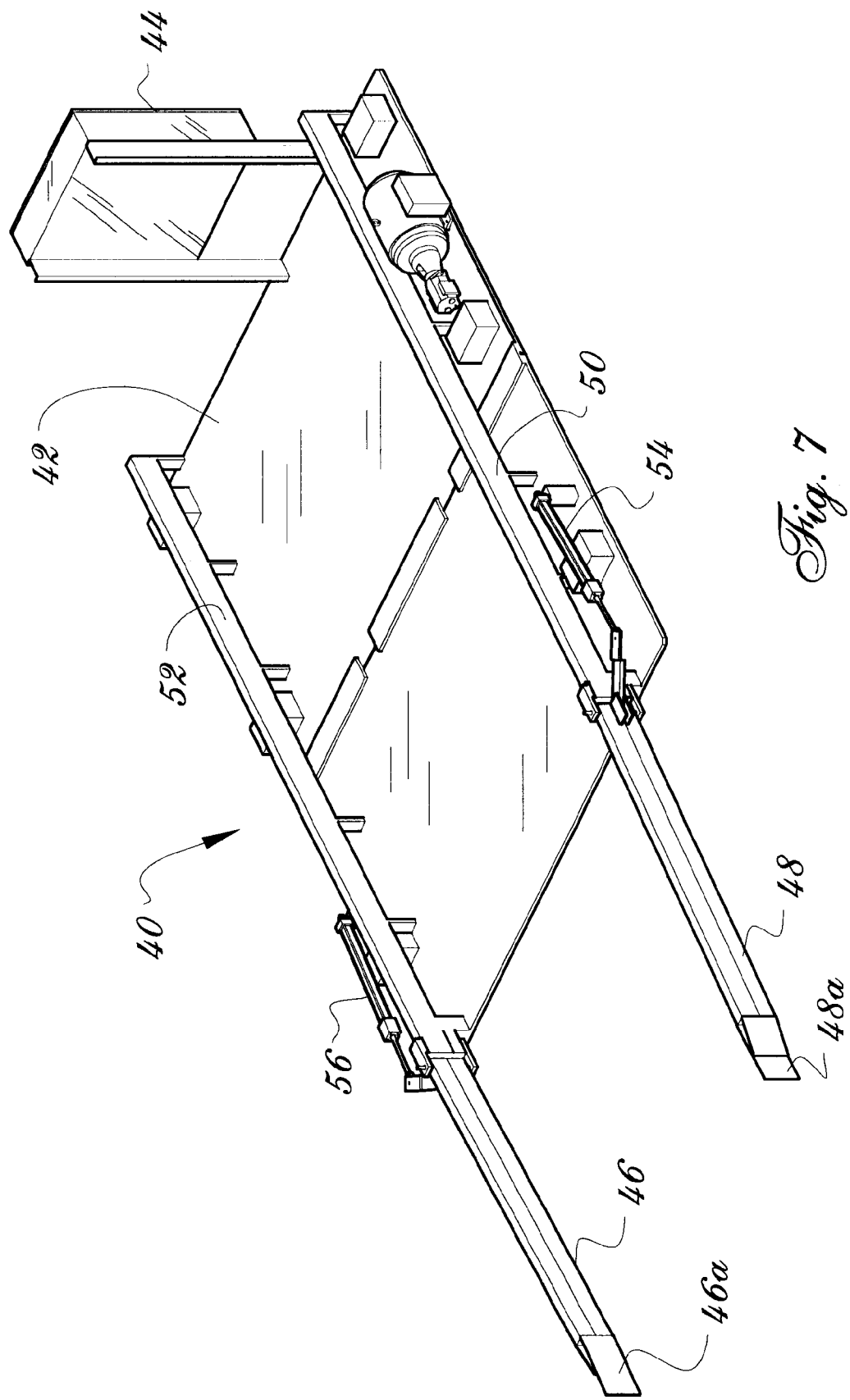
FIG. 7 is a perspective view of the carriage-carrying bogie of the invention, with the pivotable gates being shown in an opened condition.

Bogie 40 is shown in FIG. 7, and includes a rigid, flat platform 42 and a rearwardly positioned control panel 44 which allows the controller to selectively move bogie 40 along rails 38 and which further allows the controller to selectively pivot frontwardly located alignment gates 46, 48 between a closed condition (shown in FIG. 1), through an intermediate partly opened condition (shown in FIG. 2) into an opened condition (shown in FIGS. 3–7). In their opened condition, gates 46, 48 become coextensive with fixed lateral railings 50, 52 provided on each side of bogie 40, to form elongated alignment gate members preferably having substantially flat inner surfaces. The gates 46, 48 are sized to extend with their outer free end portions slightly beyond dock opening 24 when they are extracted, so as to be engageable with their outer free tips 46a, 48a against the lateral inner walls of the truck semi-trailer 30 and become co-extensive and substantially collinear with the railings 50, 52. As shown in FIG. 7, hydraulic rams 54, 56 are used to control the pivotal displacement of gates 46, 48.

Figure 8:
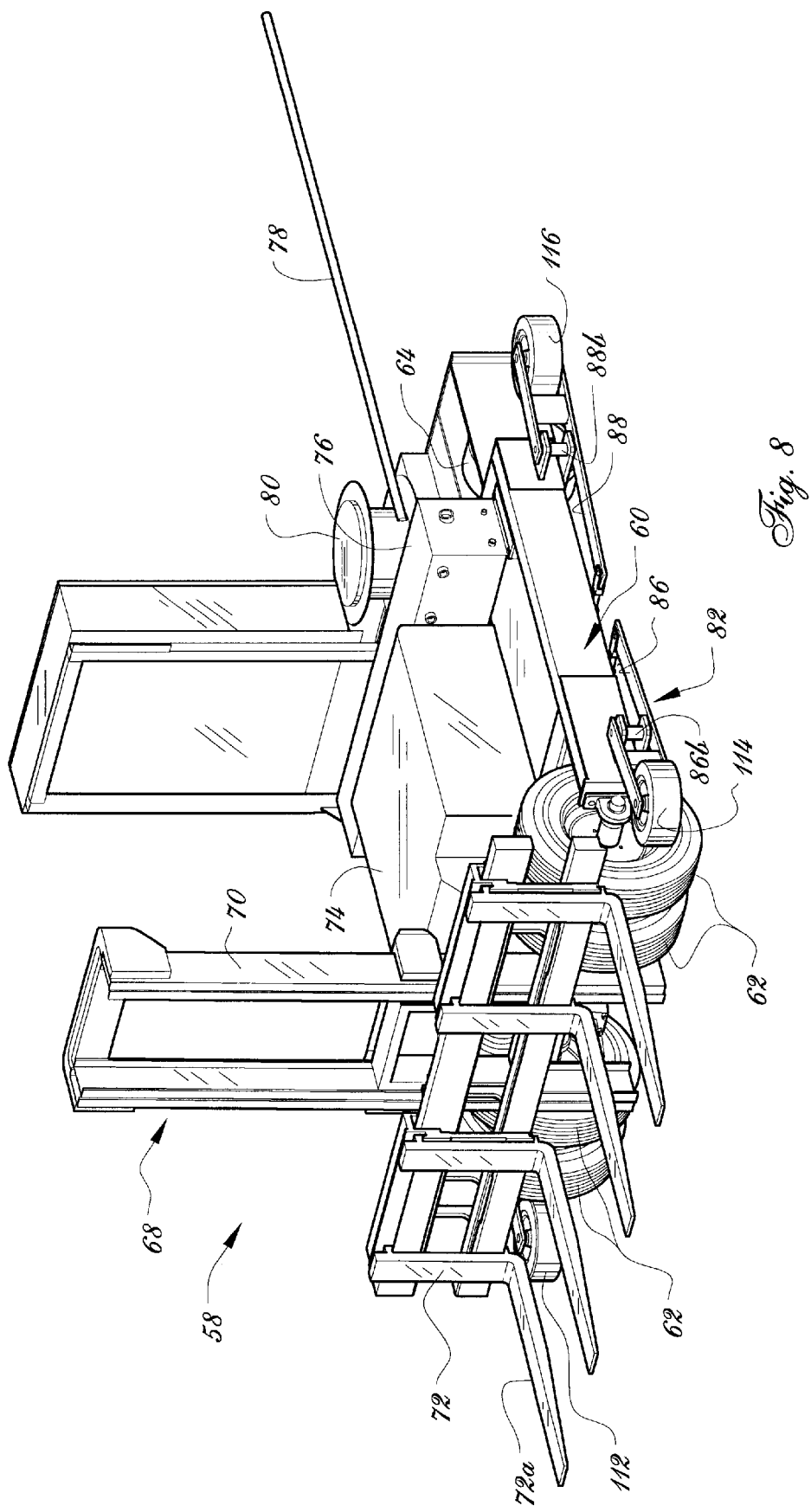
FIGS. 8 and 9 are respectively a perspective view and a top plan view of the automated carriage of the invention.
Figure 9:
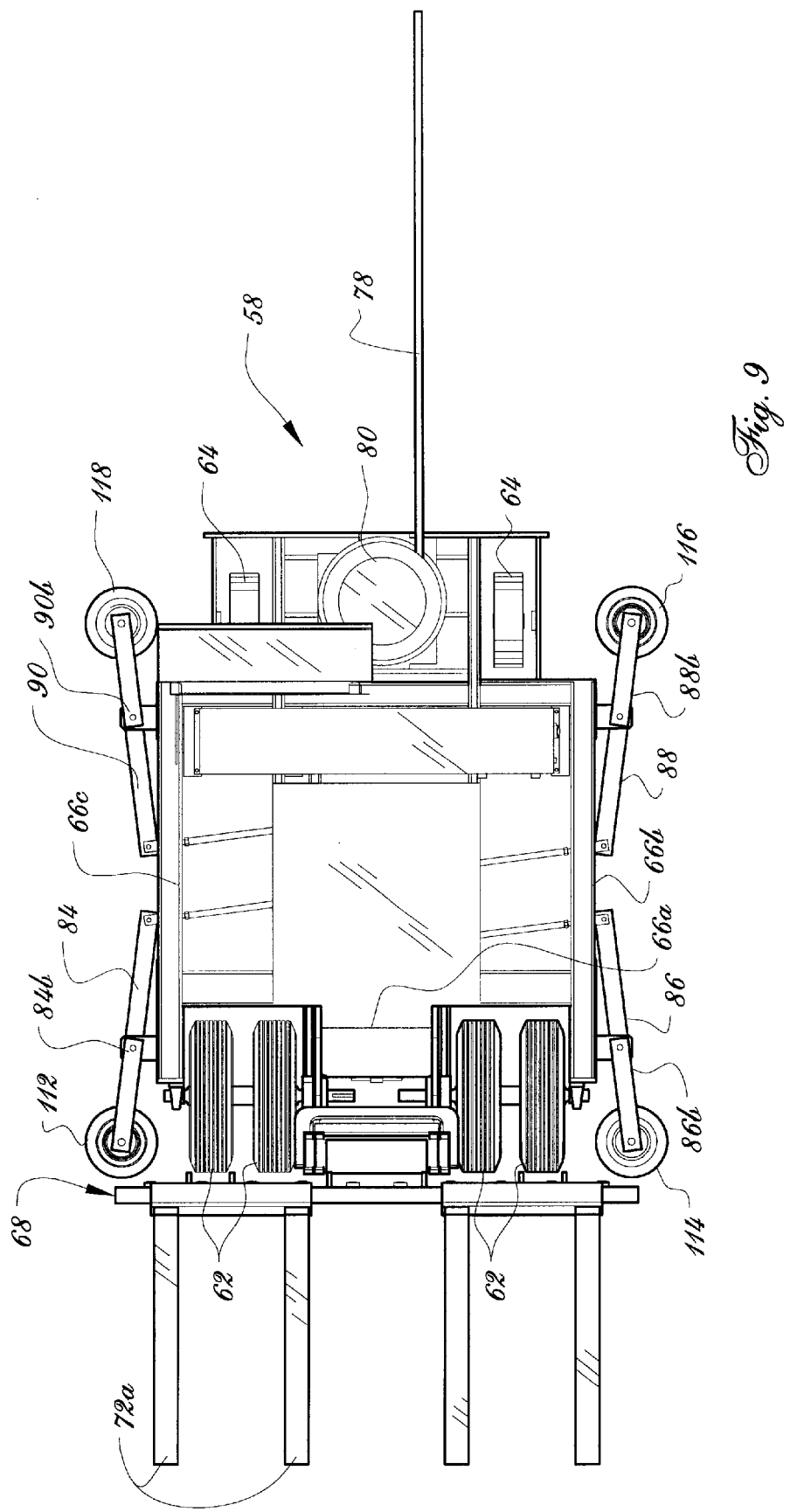
Figure 10:
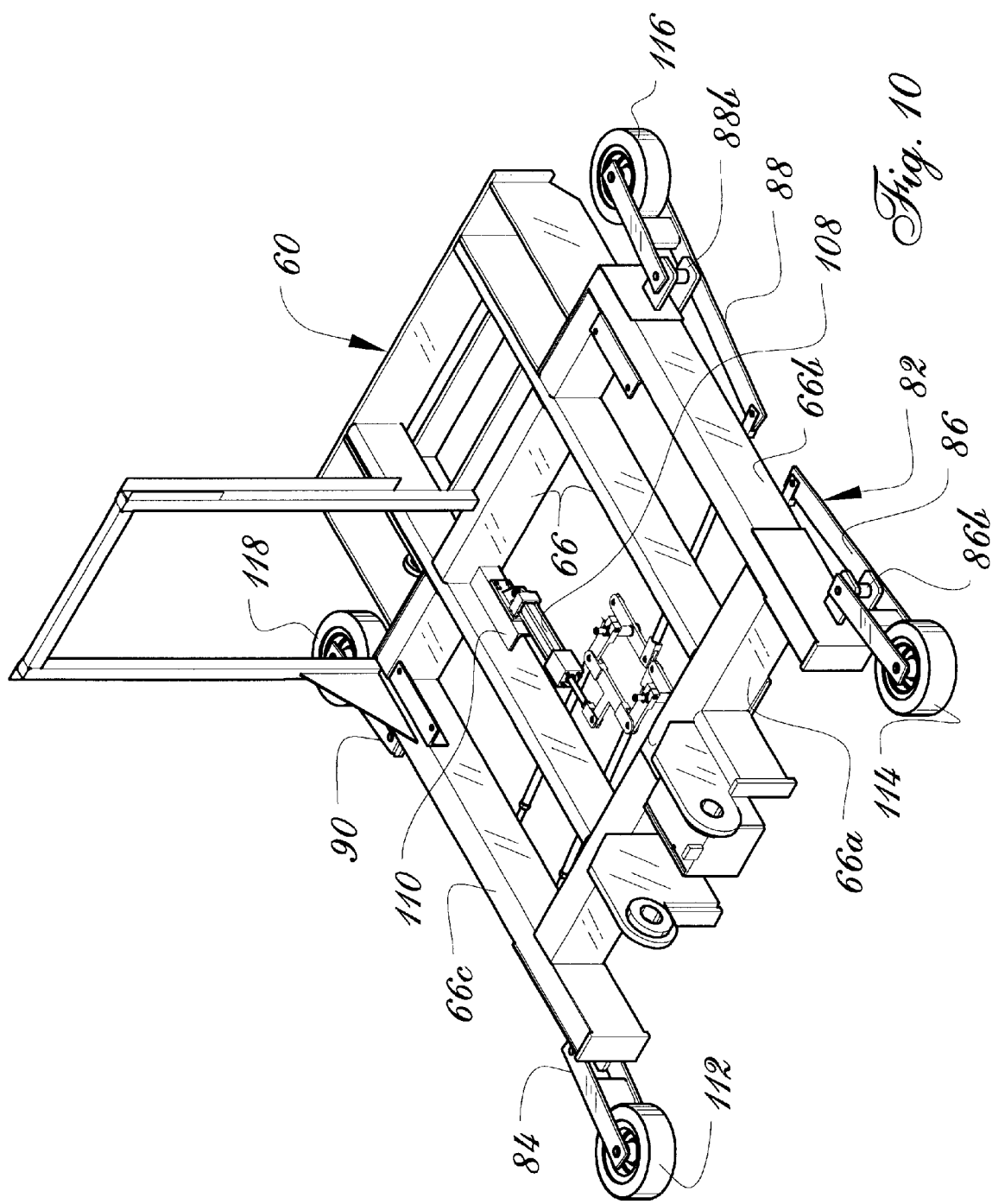
FIG. 10 is a perspective view of the frame structure and of the spring-loaded alignment linkage of the carriage of the invention.
Figure 11:
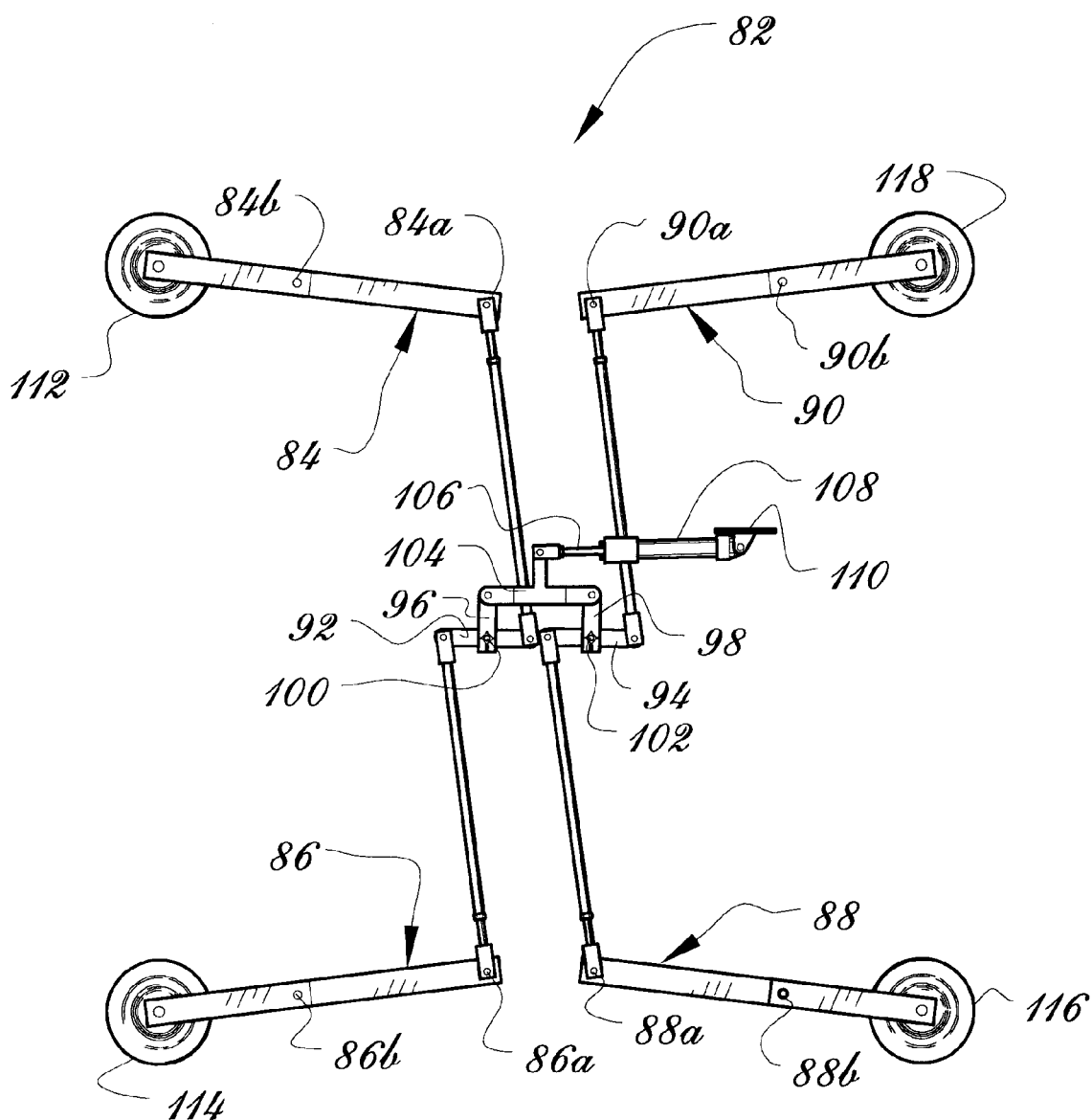
FIG. 11 is a top plan view of the spring-loaded alignment linkage of the carriage according to the invention.

A forklift carriage 58 is provided on bogie 40, as shown in FIGS. 1–6 and 8–11. Carriage 58 comprises a frame structure 60 supported over ground by a number of front and rear support wheels 62 and 64 respectively, with front support wheels 62 being larger since they will support the main load of palletized articles 36 when temporarily transported by carriage 58, as described hereinafter. Frame 60 has a number of perpendicularly arranged bars 66 to form a rigid structure, including a frontmost bar 66a supporting a forklift structure 68 and lateral bars 66b, 66c (FIGS. 9–10).

Forklift structure 68 includes a vertically disposed track member 70 fixedly attached to frontmost bar 66a of frame 60, along which a fork member 72, e.g. including four forks 72a as shown in the drawings, is vertically movable under the selectively activated bias of an actuation member in the form of a hydraulic cylinder (not shown). The fork member 72 and track member 70 assembly is of known construction, and is actuated by know means. Frame 60 further supports a casing 74 enclosing the motor elements of carriage 58, and a hydraulic fluid reservoir 76 for feeding the hydraulic cylinder allowing the vertical movement of fork member 72. A wire 78 power feeds the carriage motor, wire 78 being linked to the bogie control panel 44 as shown in FIGS. 3–6. FIGS. 8–9 further show that a spring-loaded rotatable spool 80 is provided at the rear end portion of carriage 58, on frame 60, with the wire 78 being wound around spool 80 so that wire 78 remain tensioned over ground between carriage 58 and control panel 44 while being long enough to be unrolled and allow movement of carriage 58 away from and back towards control panel 44. A carriage control panel 81 is carried at the rear end of frame 60.

Carriage 58 is further provided with a spring-loaded linkage 82 which is located under and attached to frame 60. Linkage 82 is independently shown in FIG. 11, but can be seen also in FIGS. 8–10. More particularly, linkage 82 comprises four elbowed L-shaped links 84, 86, 88, 90 which are each pivotable at their respective elbows 84a, 86a, 88a, 90a and which are pivotally linked by pairs with short rods 92, 94 centrally under frame 60, i.e. rear links 88, 90 are pivotally attached to rear rod 94, and front links 84, 86 are pivotally attached to front rod 92. Rods 92, 94 are in turn centrally integrally attached to the end portions of intermediate plates 96, 98 at 100, 102, with pivots 100, 102 being pivotally mounted to the frame 60 (not shown in FIG. 10). Thus, rod 92 and plate 96 are forced into integral pivotal displacement about pivot 100, as are rod 94 and plate 98 about pivot 102. Intermediate plates 96, 98 are pivotally attached to the two opposite ends of a T-shaped plate 104, which is in turn pivotally attached to the outer extremity of the movable rod 106 of a hydraulic cylinder 108 fixedly attached at its base to frame 60 at 110. Links 84, 86, 88, 90 are each pivotally attached to the carriage main frame 60 at 84b, 86b, 88b, 90b, and support horizontally disposed idle guide wheels 112, 114, 116, 118 at their outer free ends.

Thus, due to the interconnection of the different links, bars and rods of linkage 82, and to the fact that linkage 82 is only pivotally attached to frame 60 at 84b, 86b, 88b, 90b, at 100, 102 and at 110, guide wheels 112, 114, 116, 118 are integrally linked in their movements by linkage 82, i.e. if one wheel such as wheel 112 is force inwardly, then all other wheels 114, 116, 118 will also be forced to pivot inwardly of a same distance. Guide wheels 112, 114, 116, 118 thus pivot in a common symmetrical motion, relative to frame 60, from an outer limit position to an inner limit position. Hydraulic cylinder 108 continuously biases wheels 112, 114, 116, 118, by means of linkage 82, towards said outer limit position.

Wheels of a same side, i.e. wheels 112 and 118 and wheels 114 and 116, are longitudinally aligned, and each pair of longitudinally aligned wheels 112, 118 and 114, 116 laterally protrudes beyond all other structural elements of carriage 58, even when wheels 112, 114, 116, 118 are pivoted into their inner limit position.

In use, to load palletized articles 36 into a semi-trailer 30, bogie 40 is moved along rails 38 towards loading station 20 as shown in FIG. 1, until it becomes aligned in facing register and centered with dock 22 as shown in FIG. 2. Automated cue means then trigger the controls of bogie 40 to immobilize it at this position, bogie 40 then also being in facing register with articles 36 since the latter, as stated hereinabove, are centrally aligned relative to bogie 40 by conveyor 34. The bogie gates 46, 48 are then pivoted towards their opened condition as also shown in FIG. 2, until they abut against the side walls of the semi-trailer 30 with their tips 46a, 48a. Gates 46, 48, in their opened condition, are then co-extensive and approximately collinear with the railings 50, 52, so as to define a carriage path from bogie 40 to semi-trailer 30.

The rear opening of semi-trailer 30 has been positioned in approximate facing register with dock 22 by a truck driver, but slight positional deviations of semi-trailer 30 relative to dock 22 can and in practice do occur. Indeed, it is likely that the semi-trailer 30 may not be exactly perpendicular to the dock opening 24 and/or not exactly centered relative to the dock opening 24, and thus a slight angular deviation of gates 46, 48 in their opened condition relative to railings 50, 52 is possible, since the gates' outer free tips 46a, 48a abut against the misaligned semi-trailer opening. Also, depending on the width of the semi-trailer 30 opening, gates 46, 48 may be disposed in a parallel or in a more or less convergent fashion. However, railing 50 forms a continuous gate member with gate 48, as does railing 52 with gate 46, albeit not necessarily a straight one, which results in the "substantially" collinear relationship.

Once gates 46, 48 are in their opened condition, detection devices on bogie 40 measure the angles of gates 46, 48, and by simple trigonometric calculations based on the respective angles of gates 46, 48 which abut with their tips 46a, 48a against the semi-trailer 30 rear opening, bogie 40 moves so as to center itself relative to the semi-trailer 30 rear opening. Conveyor 34 then also moves consequently to align palletized articles 36 with the corrected position of bogie 40 by means of electronic cue means.

Figure 3:
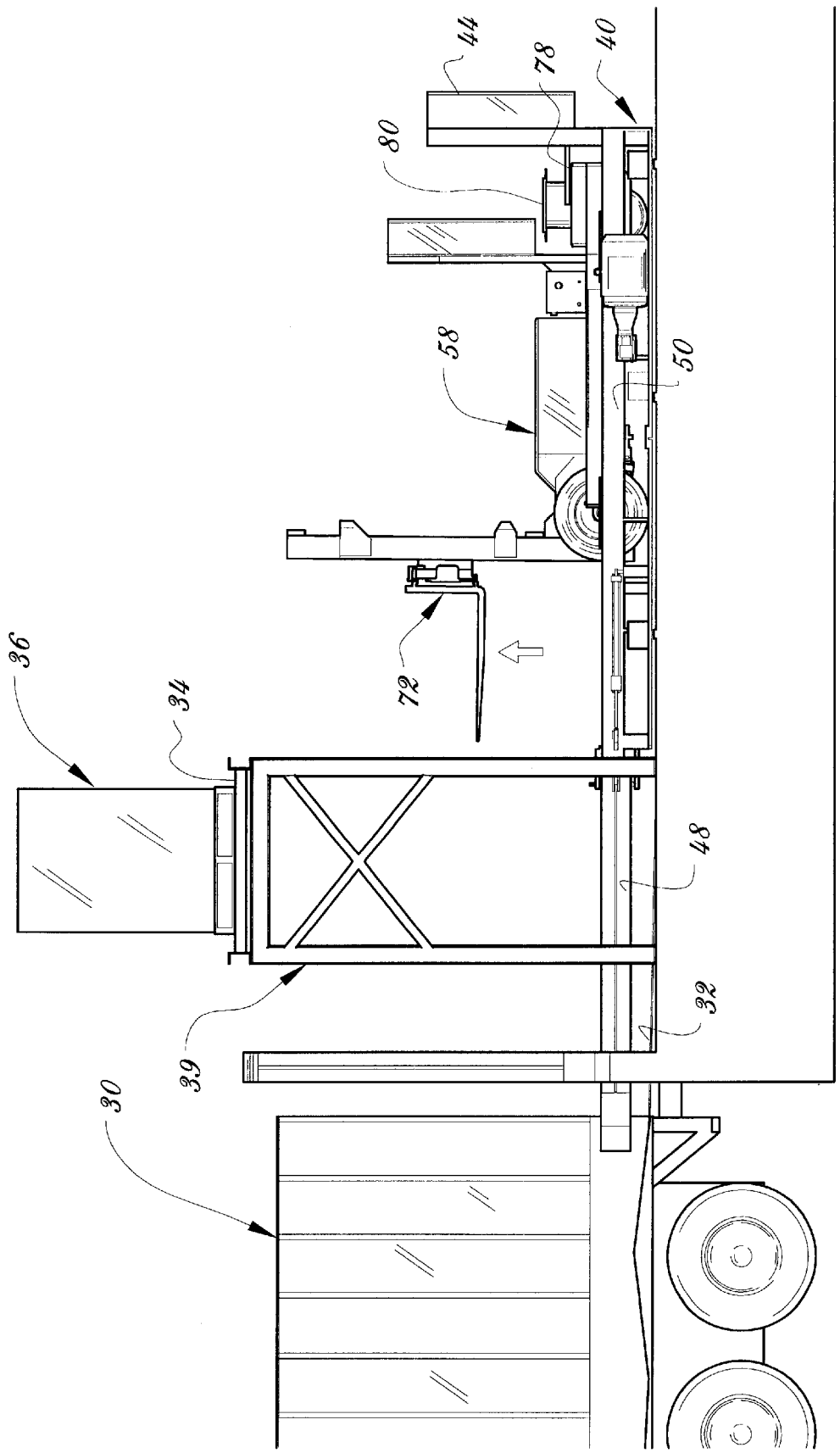
FIGS. 3 to 6 are side elevations of the elements shown in FIG. 2, sequentially illustrating the steps of the articles being loaded into the semi-trailer.
Figure 4:
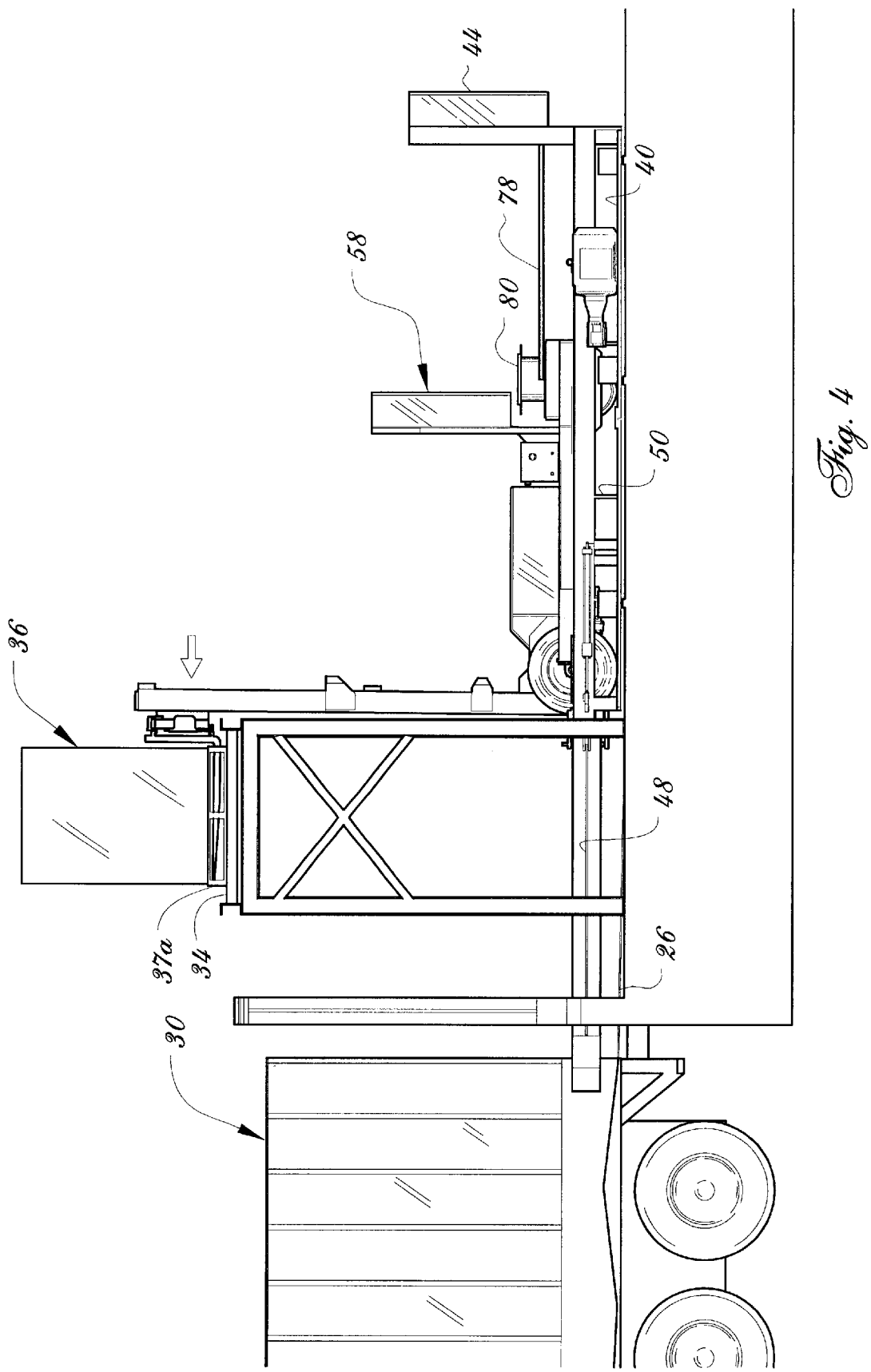

The fork member 72 of forklift carriage 58 is then raised, as shown in FIG. 3, and carriage 58 moved forward as shown in FIG. 4 so that fork member 72 engage in a known manner the pallets 37a of palletized articles 36 located on overhead conveyor 34. Since palletized articles 36 are symmetrically aligned relative to bogie 40, articles are thus loaded on fork member 72 in a centered manner. As shown in FIG. 5, articles 36 are then retrieved by carriage 58 which moves rearwardly and then lowers its fork member 72. Carriage 58 finally moves forward into semi-trailer 30 as shown in FIG. 6 to unload the articles 36 therein. As shown in the drawings, the height of conveyor 34 is greater than that of dock opening 24, and thus the articles 36, destined to fit into a semi-trailer 30 and thus to also fit through dock opening 24, will vertically fit under conveyor 34.

According to the invention, the spring-loaded alignment linkage 82 allows carriage 58 to self- align and remain centered while it moves forward and backward between the railings 50, 52, the gates 46, 48 and into the semi-trailer 30. Indeed, the carriage guide wheels 112, 114, 116, 118 are continuously forced outwardly under the bias of hydraulic cylinder 108, and continuously engage in their initial position the railings 50, 52 of bogie 40. When carriage 58 moves forward towards semi-trailer 30, guide wheels 112, 114, 116, 118 will continuously engage successively the railings 50, 52, the gates 46, 48 and the inner side walls of the semi-trailer 30. Moreover, the force exerted by hydraulic cylinder 108 will force guide wheels 112, 114, 116, 118 to remain symmetrically disposed relative to frame 60 as carriage 58 advances, thereby effectively centering the carriage 58 during its path towards and into the semi-trailer 30.

Consequently, even if the semi-trailer is not perfectly centered or angularly oriented relative to the dock 22, the guide wheels 112, 114, 116, 118 in combination with the spring-loaded linkage 82, will ensure that carriage 58 enters the semi-trailer 30 in a correctly aligned and centered fashion. This is why carriage 58 is said to be self-aligning.

It can be seen that the system according to the present invention can be used with semi-trailer trucks 30 of different widths. Indeed, if the semi-trailer is narrower, then the gates 46, 48 will abut against the semi-trailer side walls in a slightly convergent fashion, with the spring-loaded linkage 82 and the idle guide wheels 112, 114, 116, 118 compensating for the narrower path along which carriage 58 must advance by being contracted by the converging gates.

Preferably, the lateral offset between the pairs of longitudinally aligned wheels at the wheels outer limit position will be equal to or wider than the wider dimensions of semi-trailer trucks, and the angular deflections of linkage 82 will allow the pairs of longitudinally aligned wheels 112, 118 and 114, 116 to become at least as narrow as the narrower dimensions of semi-trailer trucks. For example, in North America, the width of conventional semi-trailers varies between approximately 94 inches (240 centimeters) and 102 inches (260 centimeters). Thus, the angular deflection of guide wheels 112, 114, 116, 118 would allow the width of the longitudinally aligned pairs of guide wheels 112, 118 and 114, 116 to vary at least between the above-mentioned dimensions, so that carriage 58 would operatively fit into semi-trailers of all conventional dimensions. Of course, dimensional adjustments may be envisioned on linkage 82, to fit trucks of varying sizes, the above dimensions being provided as examples.

It is noted that with the system according to the present invention, loading of articles into semi-trailer 30 may be accomplished automatically, without any human intervention, after the operation is initiated. Indeed, the following sequential steps are automatically accomplished by the system according to the present invention:

a) initial positioning of bogie 40 in centered relationship with dock opening 24;

b) opening of gates 46, 48 until they abut against the semi-trailer 30 rear opening;

c) positional rectification of bogie 40 for centered alignment with the semi-trailer 30 storage area to reach a symmetrical angular relationship of gates 46, 48;

d) articles 36 are conveyed by conveyor 34 until they come in centered alignment with bogie 40 in its corrected position;

e) loading of palletized articles 36 onto carriage 58;

f) unloading of articles 36 from carriage 58 into the semi-trailer 30 storage area by carriage 58; and g) return of carriage 58 to bogie 40;

where steps (d) to (g) may be repeated a number of times to load numerous palletized articles into semi-trailer 30, with the orientation of bogie 40 being corrected accordingly, if semi-trailer 30 is angularly offset relative to the loading station 22, by the action of the idle wheels 112, 114, 116, 118 and of linkage 82. The control units for controlling the displacements and movements of bogie 40, carriage 58 and conveyor 34 can be located in control panels 44 and 81.

Any further modification to the present invention, which does not deviate from the scope thereof, is considered to be included therein.

For example, it could be envisioned to provide a system according to the present invention which would comprise a single loading station, and consequently in which the transversely moving bogie would not be required.

Also, it could be envisioned to provide a system according to the invention lacking the carriage-guiding railings 50, 52 and pivotable gates 46, 48, in which the carriage 58 is initially aligned with the truck semi-trailer opening by other means, and then moved forward into the semi-trailer opening repetitively to successively load a number of articles. However, this is not the preferred way to carry out the invention.

Also, other article-carrying devices than forklift members could be used.

The hydraulic cylinder 108 used to force idle guide wheels 112, 114, 116, 118 towards their outer limit position, could be replaced by any suitable spring member, although the hydraulic cylinder remains the preferred way to carry out the invention.

The guide wheels shown could be replaced with suitable sliding elements, e.g. small skis made of a sliding material such as nylon.

We claim:

1. A carriage for carrying articles, said carriage having two sides, and a front and a rear end defining a longitudinal axis therebetween, said carriage comprising a main rigid frame, ground-engaging wheels rollably mounted to said frame parallel to said longitudinal axis for carrying said frame over ground, a motor mounted to said frame for feeding power to and driving said carriage along said longitudinal axis, a powered article-carrying device mounted to said carriage frame for carrying the articles on said carriage, a number of lateral idle guide members mounted to said frame and laterally protruding beyond said frame on both said carriage sides for engagement of said guide members against spaced-apart lateral surfaces outboard of said carriage, and a linkage pivotally attached to said frame, carrying and interconnecting said guide members and forcing said guide members into an integral common displacement relative to said frame so that they remain symmetrically disposed relative to said longitudinal axis at all times, said guide members being movable relative to said frame between an inner limit position toward said frame and an outer limit position away from said frame, said carriage also comprising a biasing member mounted to said frame and continuously biasing said guide members through the instrumentality of said linkage towards said outer limit position, wherein said carriage is adapted for self-alignment and self-centering between the spaced-apart lateral surfaces by said guide members continuously engaging the spaced-apart surfaces and by said linkage and said biasing member forcing said guide members to remain symmetrically disposed relative to said longitudinal axis.

2. A carriage as defined in claim 1, wherein said guide members are idle guide wheels, with said linkage rollably carrying said idle guide wheels, wherein said carriage is adapted for self-alignment between spaced-apart surfaces by said guide wheels continuously rollably engaging the spaced-apart lateral surfaces and by said linkage and said spring member forcing said guide wheels to remain symmetrically disposed relative to said carriage frame at all times.

3. A carriage as defined in claim 1, further comprising a control unit for automatically controlling the displacement of said carriage along said longitudinal axis.

4. A carriage as defined in claim 1, wherein said biasing member is a hydraulic cylinder.

5. A carriage as defined in claim 1, wherein said article-carrying member is a powered hydraulic forklift member located at said carriage front end.

6. A loading and unloading system for loading articles into and unloading articles from a number of storage areas each having an open end and inner side walls, said system including:

a carriage for carrying articles, said carriage having two sides, and a front and a rear end defining a longitudinal axis therebetween, said carriage comprising a main rigid frame, ground-engaging wheels rollably mounted to said frame parallel to said longitudinal axis for carrying said frame over ground, a motor for feeding power to and driving said carriage along said longitudinal axis, a powered article-carrying device mounted to said carriage frame for carrying the articles on said carriage, a number of lateral idle guide members mounted to said frame and laterally protruding beyond said frame on both said carriage sides for engagement of said guide members against the storage area side walls outboard of said carriage, and a linkage pivotally attached to said frame, carrying and interconnecting said guide members and forcing said guide members into an integral common displacement relative to said frame so that they remain symmetrically disposed relative to said longitudinal axis at all times, said guide members being movable relative to said frame between an inner limit position toward said frame and an outer limit position away from said frame, said carriage also comprising a biasing member mounted to said frame and continuously biasing said guide members through the instrumentality of said linkage towards said outer limit position, wherein said carriage is adapted for self-alignment and self-centering between the side walls of the storage area by said guide members continuously engaging the side walls and by said linkage and said biasing member forcing said guide members to remain symmetrically disposed relative to said longitudinal axis; and a bogie, able to carry said carriage and movable along a bogie horizontal axis transverse to said carriage longitudinal axis, said bogie comprising a motor for feeding power to and moving said bogie along said bogie axis, and a platform for receiving and supporting said carriage thereon and defining two sides and a front and a rear end portions, said bogie front end portion being opened at least when said carriage rolls out of and back onto said bogie, wherein said bogie is movable between the storage areas to allow said carriage to load articles onto and unload articles from the different storage areas.

7. A system as defined in claim 6, wherein said guide members are idle guide wheels, with said linkage rollably carrying said idle guide wheels, wherein said carriage is adapted for self-alignment and self-centering between the storage area side walls by said guide wheels continuously rollably engaging the storage area side walls and by said linkage and a spring member forcing said guide wheels to remain symmetrically disposed relative to said carriage frame at all times.

8. A system as defined in claim 7, wherein said bogie comprises two parallel railings each fixedly attached to a corresponding said side of said bogie, the distance between said railing being equal to or lesser than the width of said carriage when said guide wheels are in said outer limit position, said railings vertically registering with said guide wheels, said guide wheels consequently continuously engaging said railings while said carriage is located between said railings for self-aligning and self-centering said carriage on said bogie due to said spring member and said linkage.

9. A system as defined in claim 8, wherein said bogie further comprises a pair of gates pivotally mounted on each said side of said bogie at said bogie front end portion, said gates vertically registering with said carriage guide wheels and being pivotable between a closed condition in which they do not extend beyond the bogie front end portion, and an opened condition in which they extend beyond the bogie front end portion in a co-extensive and substantially collinear fashion relative to said railings, said gates having outer free ends destined to engage the two surrogate area side walls, for providing continuous side panels formed on either side carriage by said railings, said gates and the surrogate area side walls, for continuous engagement of these side panels by said carriage guide wheels when said carriage moves between said bogie and the storage area, said carriage thus being self-aligned and self-centered relative to the storage area during article loading and unloading operations in the storage area.

10. A system as defined in claim 9, further comprising a control unit for automatically controlling the displacement of said bogie along bogie axis, the displacement of said carriage along said longitudinal axis, and the pivotal displacement of said gates.

11. A system as defined in claim 6, wherein said biasing member is a hydraulic cylinder.

12. A system as defined in claim 10, wherein said article-carrying member is a powered hydraulic forklift member located at said carriage front end.

13. A system as defined in claim 12, further comprising a conveyor for conveying articles and located frontwardly of said bogie, wherein said carriage is destined to carry the articles with said forklift member from said conveyor into the loading area for unloading them therein.

14. A system as defined in claim 13, wherein said conveyor is an overhead conveyor located spacedly above ground, said carriage carrying the articles being destined to move underneath said overhead conveyor and to reach the articles on the conveyor with said forklift member.

15. A system as defined in claim 14, wherein said control unit further automatically controls said conveyor, for positioning the articles thereon in a precise centered relationship relative to said bogie.

16. A system as defined in claim 15, wherein said bogie is movable on fixed rails.

17. A vehicle loading and unloading system for loading articles into and unloading articles from a number of vehicles each located at a respective loading station and each having a storage area including an open end and parallel inner side walls, said system including:

a loading dock at each said loading station, adapted to receive in a closely adjacent fashion the open end of the vehicle;

a bridge panel at each said loading station, for bridging each said loading dock with a corresponding vehicle storage area;

a carriage for carrying articles, said carriage having two sides, and a front and a rear end defining a longitudinal axis therebetween, said carriage comprising:

a main rigid frame;

ground-engaging wheels rollably mounted to said frame parallel to said longitudinal axis for carrying said frame over ground;

a motor for feeding power to and driving said carriage along said longitudinal axis;

a powered forklift member mounted to said frame at said front end thereof for carrying the articles on said carriage;

a linkage pivotally attached to said frame;

a number of lateral idle guide wheels horizontally rollably mounted to said linkage and laterally protruding beyond said frame on both said carriage sides, said guide wheels forced by said linkage into an integral common displacement relative to said frame so as to remain symmetrically disposed relative to said frame at all times, said guide wheels carried by said linkage being movable between an inner limit position toward said frame and an outer limit position away from said frame; and a spring member mounted to said frame and continuously biasing said wheels through the instrumentality of said linkage towards said outer limit position;

said system further comprising:

a bogie mounted to fixed rails, able to carry said carriage and movable along a bogie horizontal axis transverse to said carriage longitudinal axis, said bogie comprising:

a motor for feeding power to and moving said bogie along said bogie axis;

a platform for receiving and supporting said carriage thereon and defining two sides and a front and a rear end portions;

two parallel railings each fixedly attached to a corresponding said side of said bogie, the distance between said railings being equal to or lesser than the width of said carriage when said guide wheels are in said outer limit position, said railings vertically registering with said guide wheels; and a pair of gates pivotally mounted on each said side of said bogie at said bogie front end portion and defining outer free ends, said gates vertically registering with said guide wheels and being pivotable between a closed condition in which they do not extend beyond the bogie front end portion, and an opened condition in which they extend beyond the bogie front end portion in a co-extensive and substantially collinear fashion relative to said railings, and in which they clear the bogie front end portion;

and said system further comprising a conveyor, for conveying articles to be loaded into vehicles to each said loading station and for conveying articles unloaded from vehicles from each said loading station;

wherein said bogie is movable between the loading stations to allow said carriage to load articles onto or unload articles from vehicles located at each one of the loading stations, with said gates opening at each station where loading or unloading operations are to take place, said gates destined to abut with their outer free end portions against the side walls of the vehicle for forming with said railings and the vehicle side walls continuous side panels which will be continuously engaged by said carriage guide wheels while said carriage moves between said bogie and said vehicle storage area, thereby allowing self-alignment and self-centering of said carriage into said vehicle storage area due to the bias of said spring member against said guide wheels through the instrumentality of said linkage.

18. A system as defined in claim 10, wherein said control unit can adjust the position of said bogie when said gales are in said opened condition according to the respective angles of said gates in said opened condition, so as to center said bogie between said loading area side walls.

\* \* \* \* \*